US008629805B2

(12) United States Patent
Pulford

(10) Patent No.: US 8,629,805 B2
(45) Date of Patent: Jan. 14, 2014

(54) NAVIGATION SYSTEM INTEGRITY

(75) Inventor: Graham William Pulford, Plouzane (FR)

(73) Assignee: Qinetiq Limited, London (GB)

(*) Notice: Subject to any disclaimer, the term of this patent is extended or adjusted under 35 U.S.C. 154(b) by 174 days.

(21) Appl. No.: 13/147,043

(22) PCT Filed: Jan. 20, 2010

(86) PCT No.: PCT/GB2010/000077
§ 371 (c)(1),
(2), (4) Date: Jul. 29, 2011

(87) PCT Pub. No.: WO2010/086583
PCT Pub. Date: Aug. 5, 2010

(65) Prior Publication Data
US 2011/0291887 A1 Dec. 1, 2011

(30) Foreign Application Priority Data
Jan. 31, 2009 (GB) .................................. 0901685.8

(51) Int. Cl.
*G01S 19/20* (2010.01)
(52) U.S. Cl.
USPC ..................................................... 342/357.58
(58) Field of Classification Search
USPC ............... 342/357.4, 357.45, 357.51, 357.58; 701/467, 468
See application file for complete search history.

(56) References Cited

U.S. PATENT DOCUMENTS

| 6,798,377 | B1 | 9/2004 | Lupash et al. |
| 7,219,013 | B1 | 5/2007 | Young et al. |
| 2005/0114023 | A1 | 5/2005 | Williamson et al. |
| 2008/0062041 | A1 | 3/2008 | Lee |

OTHER PUBLICATIONS

Sep. 21, 2012 Examination Report issued in European Patent Application No. 10 702 328.5.
Ober, P.B., "Integrity According to Bayes," Delft University of Technology, Netherlands, *IEEE 2000, Position Locations and Navigation Symposium*, pp. 325-332.
Pullen et al., "A New Approach to GPS Integrity Monitoring Using Prior Probability Models and Optimal Threshold Search," Department of Aeronautics and Astronautics, Stanford University, *Proceedings of 1994 IEEE Position, Location and Navigation Symposium*, pp. 739-746.
British Search Report issued in Application No. 0901685.8; Dated May 21, 2009.
Written Opinion of the International Searching Authority issued in Application No. PCT/GB2010/000077; Dated May 7, 2010.
International Search Report issued in Application No. PCT/GB2010/000077; Dated May 7, 2010,.

*Primary Examiner* — Dao Phan
(74) *Attorney, Agent, or Firm* — Oliff and Berridge, PLC

(57) ABSTRACT

A method for modelling integrity of a filtered global navigation satellite system, by calculating component navigation system error distributions for a set of fault conditions and a fault free condition, and determining overall navigation error distribution by forming a mixture distribution from these component navigation system error distributions. The mixture distribution may be determined by weighted summation of navigation system error (NSE) distributions with weightings determined according to prior probabilities for the fault conditions. Once the overall NSE mixture distribution is determined in this way, it can be used to derive one or more statistical quantities relevant to the integrity of the navigation system such as the probability of exceeding given alert limits in a desired coordinate geometry.

15 Claims, 4 Drawing Sheets

NAVIGATION SYSTEM INTEGRITY

The present invention relates to global navigation satellite systems (GNSS) for absolute and relative positioning applications, and particularly but not exclusively to the integrity of such systems, and the modelling thereof.

Global navigation systems, such as GPS, Glonass and Galileo, are well known and are widely used in commercial and consumer applications. Much attention is often paid to the accuracy of such systems, and efforts are made to be able to provide location fixes to an accuracy of a small number of metres or even less. Accuracy deals with the characterisation of the navigation system error (NSE) distribution under nominal conditions. Accuracy is often specified in terms of the error standard deviation a, assuming a Gaussian distribution for the errors. To achieve particularly high accuracies, differential global navigation satellite systems have been developed which provide a position relative to a local reference frame, which reference frame typically depends on one or more other receiver devices. These may be fixed devices deployed over an area, for example an airfield, and their absolute positions can be accurately determined using surveying, for example.

A schematic of a ground based differential GPS (DGPS) augmentation system for aircraft navigation is shown in FIG. 1 by way of example, although DGPS can equally well be used for many mobile positioning applications. Here GPS receivers 102, 104 and 106, whose absolute positions are known, receive GPS signals from satellites 108 and 110. A ground based processing station 111 compares the computed positions of the receivers with their actual known positions, to provide range corrections. The range corrections are transmitted from transmitter 112 to an aircraft 114 in the vicinity. The aircraft uses the range corrections to update its own calculated position to achieve greater accuracy with respect to the local geography. An example of one such system is the Local Area Augmentation System (LAAS) developed by the US Federal Aviation Administration. This system uses what is referred to as snapshot ranging. In other words, the navigation solution at any time is determined from the current satellite range measurements.

Further improvements in navigation accuracy result from the use of filtered navigation solutions, which may also include ambiguity-fixed carrier phase ranging measurements. Filtering is often accomplished via the Kalman filter (KF) or extended Kalman filter (EKF) framework. The filtered navigation solution suffers less from uncorrelated noise since this is averaged out in the filtering process. The KF and EKF also provide a nominal position accuracy figure in the form of a state estimation error covariance matrix, commonly called the filter covariance. The filter covariance is a reliable indicator of navigation accuracy under nominal conditions, however it tends to underestimate the size of the true positioning errors when faults are present.

Integrity, as distinct from accuracy, relates to the level of confidence that can be assigned to the navigation solution under arbitrary conditions, and requires some degree of prior knowledge of system faults, failures and anomalies. Other important system performance parameters include continuity and availability. These quantities are usually defined in terms of satisfying the system accuracy and integrity requirements over a period of time and throughout a geographical region. Typically, when the navigation solution satisfies the accuracy and integrity requirements, it is said to be available. Continuity refers to the requirement that the navigation solution should be available throughout the specified phase of operation (e.g., during a landing).

A high integrity navigation system benefits from the inclusion of integrity monitors at various stages in the processing chain. The function of an integrity monitor is to detect the presence of faults that could pose a threat to the accuracy of the navigation solution. Many methods are known for the detection, isolation and exclusion of faults in navigation systems. High integrity navigation applications are often specified in terms of the integrity level during a specified period of operation or at various points on a nominal trajectory.

While the inclusion of integrity monitors can improve the reliability or integrity of the position estimates provided by the navigation system, it is generally difficult to determine quantitatively the actual system integrity. Traditional treatments of navigation system integrity design use a fault tree approach, wherein the system-level integrity allocation is divided somewhat arbitrarily between the various subsystems in terms of known equipment performance and nominal models for error sources.

Traditional navigation systems have made use of protection levels that are calculated in real time based on the known or computed statistical characteristics of the navigation system errors. The protection level (PL) is effectively a confidence interval on the relative or absolute positional error distribution expressed in the relevant coordinate frame (e.g., horizontal, vertical and along-track, for a landing system). The protection levels can be compared with specified alert limits (ALs) to determine if there is an unacceptably large risk that the navigation system errors are larger than the maximum allowable magnitudes for safe operation. The degraded accuracy of the navigation system under a fault that has been detected by the integrity monitors is reflected in an increased protection level. If the true navigation errors exceed the alert limits, and this is not brought to the user's attention within a specified time-to-alarm (TA), then an integrity failure is deemed to have occurred.

While methods are known for modelling the integrity of snapshot GPS navigation solutions in order to generate protection levels for real-time navigation, such methods are not applicable to filtered navigation solutions since they do not account for the feedback of previous position estimates. Thus integrity modelling methods used for such systems as LAAS are not applicable in navigation systems that rely on filtering to generate their navigation solutions.

It is an object of one aspect of the present invention to provide improved navigation system integrity evaluation and modelling.

According to a first aspect of the invention there is provided a method for modelling integrity of a filtered global navigation satellite system, the method comprising defining a set of fault conditions; calculating a component navigation system error distribution for a fault-free condition; calculating component navigation system error distributions for the defined set of fault conditions; and determining overall navigation error distribution by forming a mixture distribution from said plurality of component navigation system error distributions.

The use of a mixture model provides a computationally feasible solution where a Monte Carlo approach to such integrity modelling would in most cases be rendered impractical by the number of calculations required. For instance, to verify a navigation system design with a required integrity probability of $1 \text{-} 10^{-7}$ by computer simulation would require at least $10^9$ Monte Carlo runs for each temporal configuration of the constellation of GNSS satellites and geographical user position, which is impractical.

In one embodiment the mixture distribution is determined by weighted summation of NSE distributions with weightings determined according to prior probabilities for the fault conditions.

Once the overall NSE mixture distribution is determined in this way, it can be used to derive one or more statistical quantities relevant to the integrity of the navigation system. Such quantities include, but are not limited to, the probability of exceeding given alert limits in a desired coordinate geometry, the probability of integrity failure (also known as hazardously misleading information) and protection levels. This information can be used to test a given navigation system design against appropriate integrity criteria and also for implementation of real-time navigation systems, where protection levels must be generated and displayed to aid the user in making navigation decisions (e.g. changing course or aborting a landing). In practice, modelling will be conservative in most embodiments, providing an overbound on the probability of integrity failure, and providing a prediction of worst case integrity performance for a given navigation system.

By defining a set number of fault conditions, the maximum number of terms in the mixture model is fixed and finite. Other mixture modelling approaches, for instance Bayesian approaches that consider sequences and/or duration of faults, or ones that seek to obtain the posterior probability density of the navigation state conditional on the GNSS measurements while allowing for faults, typically lead to mixture distributions in which the number of components increases with time.

The plurality of fault conditions have corresponding defined fixed fault magnitudes in preferred embodiments. This avoids difficulties associated with a continuum of possible fault magnitudes and guarantees that the distribution for the overall NSE is a discrete mixture distribution rather than some more general type of statistical distribution, which would be more difficult to work with computationally.

This method offers further advantage in that the fault magnitudes can be selected as the worst case magnitude with respect to the given fault condition so that the analysis of system integrity remains conservative.

In embodiments, the worst case magnitude is the fault magnitude which yields the maximum integrity threat when evaluated against a defined optimisation criterion. This magnitude will depend on the navigation system configuration, that is, the satellite positions and user receiver position or geographical location. Such a defined magnitude will therefore be specific to a given configuration of range of configurations in embodiments, and a plurality of fault magnitudes may be determined and defined for each fault condition, corresponding to various system configurations or configuration ranges. The magnitude that produces the greatest probability of exceeding alert limits, or a practical upper bound on the fault magnitude could be used. Other factors such as time-to-alarm may result in a alternative value being selected that is considered to pose a greater integrity risk for a given navigation system. It is equally possible to consider both the NSE and the time-to-alarm integrity threats jointly in determining the worst case fault magnitudes for a given system configuration.

In certain embodiments one of more filter response models is used to calculate said component navigation system error distributions, and in selected embodiments an estimation theoretic filter is used, preferably a Kalman filter, extended Kalman filter or unscented Kalman filter.

Gaussian distributions are preferred, and although the component NSE distributions in a general mixture distribution should be of the same type, they do not need to be Gaussian. A mixture model can also be used to model the time-to-alarm distribution, in which case the component distributions would be defined for positive values only.

A further aspect of the invention provides an integrity performance model for a filtered navigation system, said model comprising a set of possible fault conditions stored in a memory; a plurality of filter response models, adapted to produce component navigation error distributions for a fault-free condition and for said plurality of fault conditions; and a mixture processor adapted to produce overall navigation error by forming a mixture distribution from said plurality of component navigation system error distributions output from said filter response models.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which.

Figure 4:
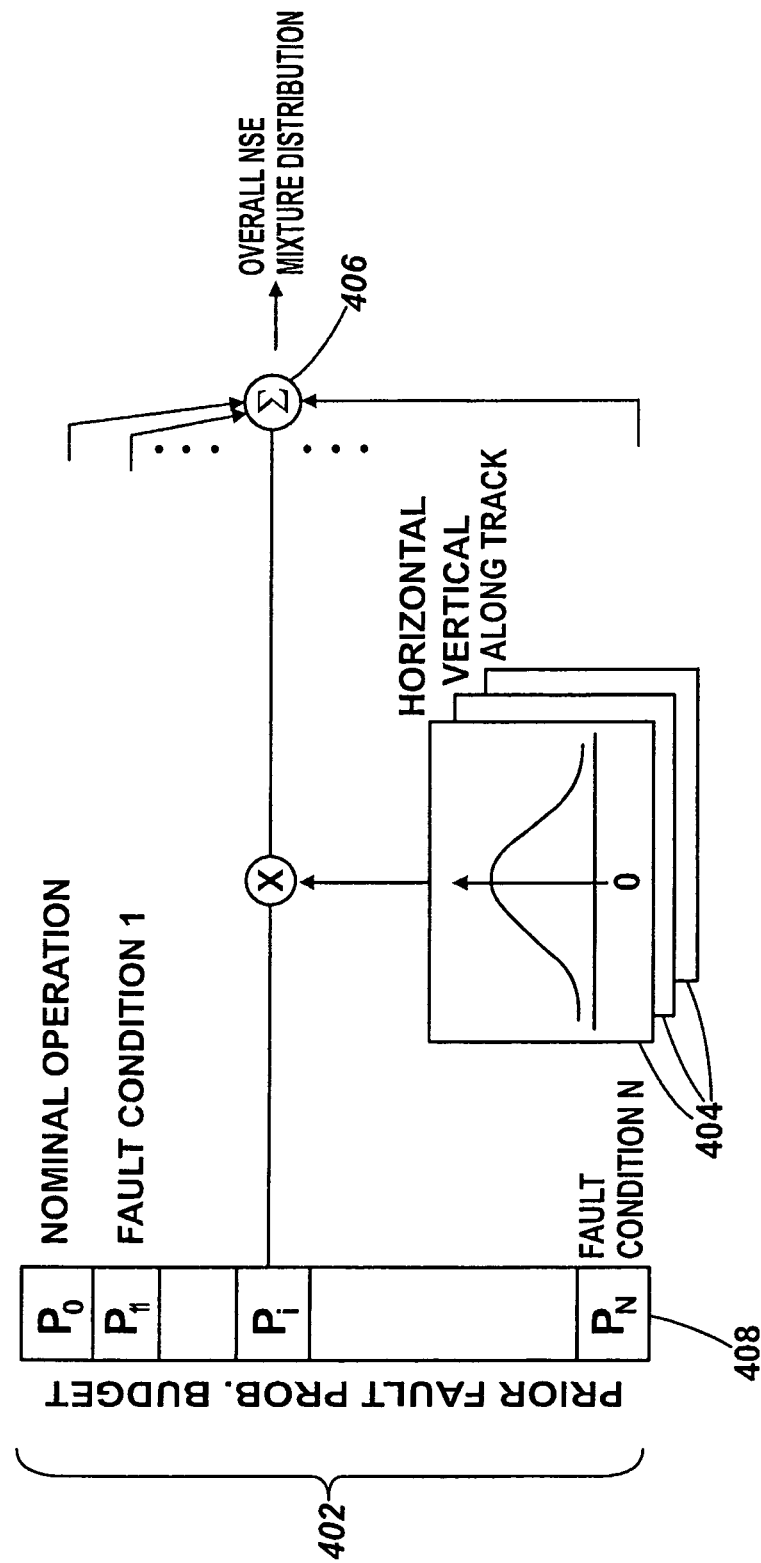
Figure 5:
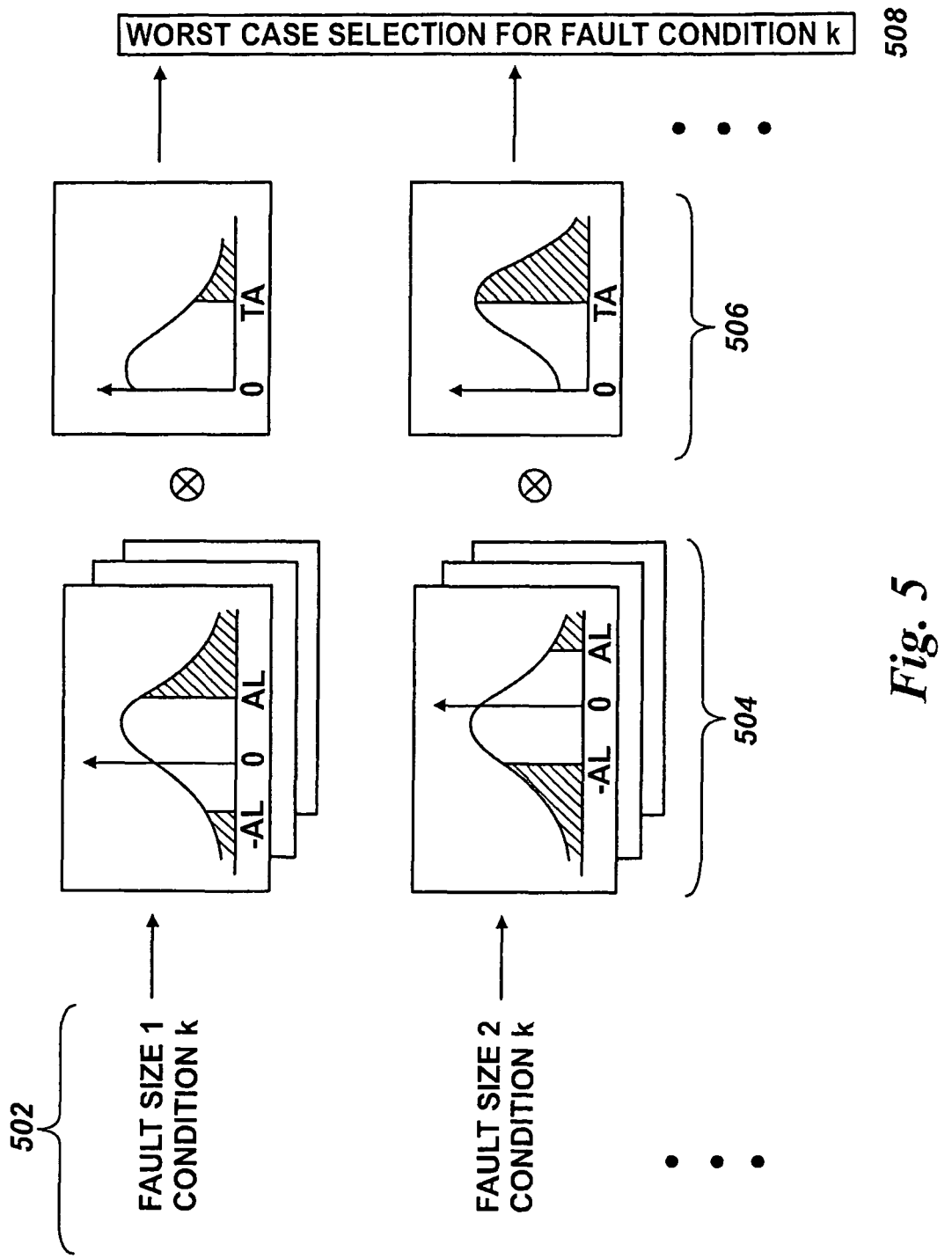

FIG. 4 further illustrates overall integrity calculation framework for a particular navigation system configuration;

FIG. 5 further illustrates worst case fault magnitude calculation.

Figure 1:
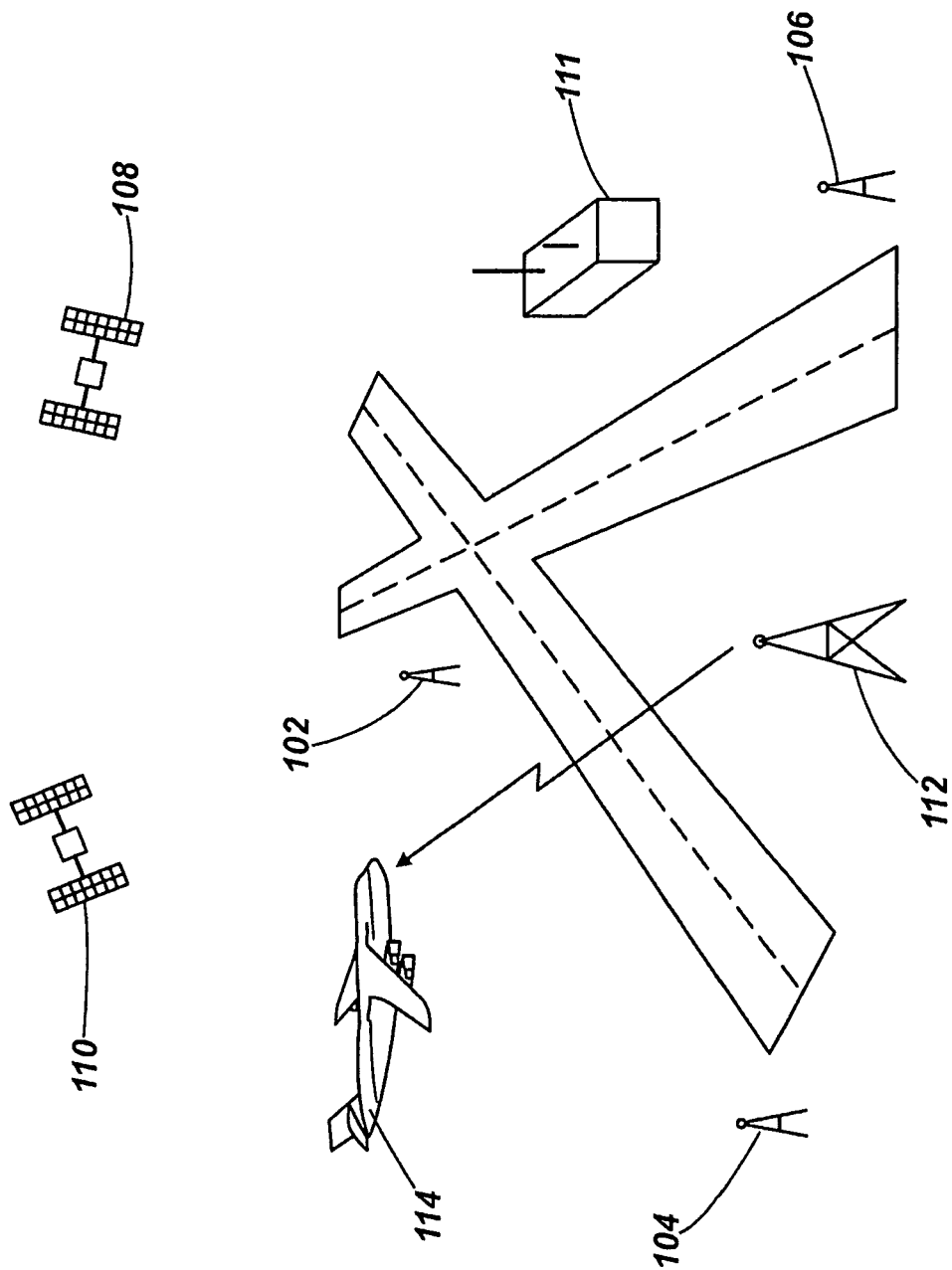
FIG. 1 shows a prior art GPS augmentation system.
Figure 2:
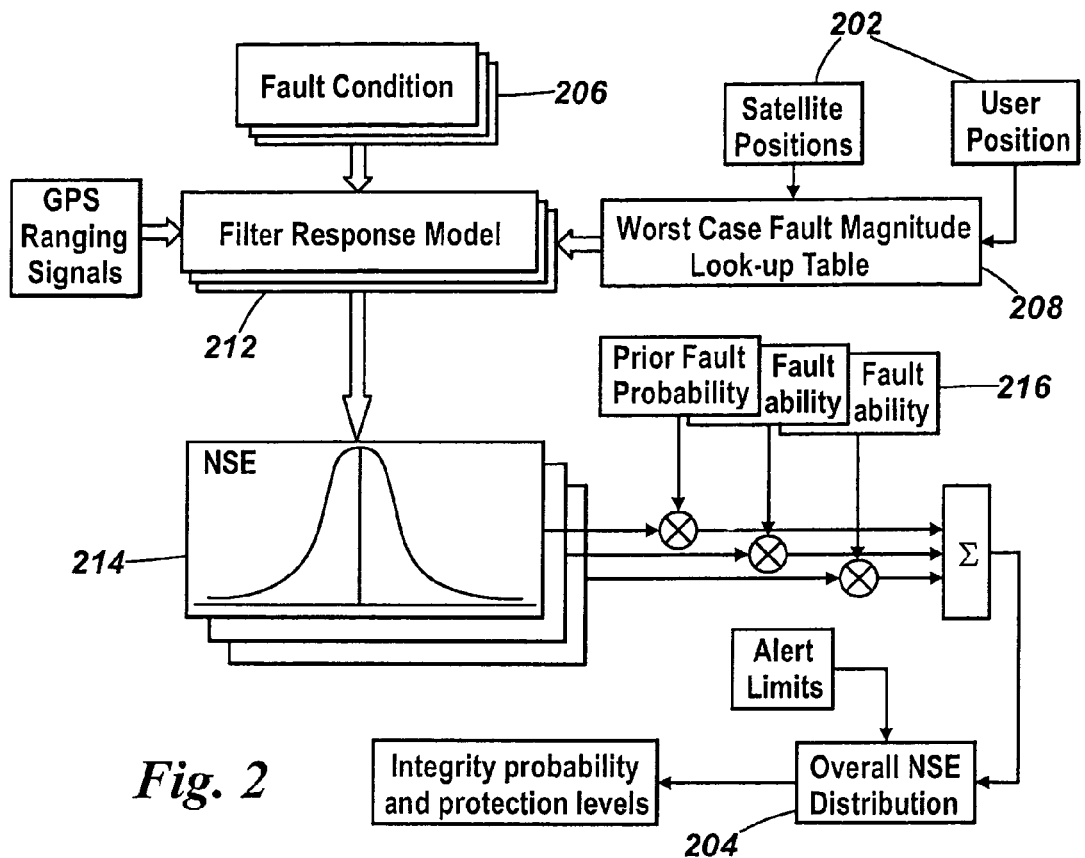
FIG. 2 is a block diagram of a navigation system integrity performance model using worst case fault magnitudes, prior fault probabilities and filter response models for obtaining the overall NSE mixture distribution.

An example navigation system integrity performance model (NSIPM) relevant to a shipboard-relative GPS (SRGPS) navigation system is shown in FIG. 2. The system configuration 202 (positions of ship, aircraft and satellites) is provided at the input, and probability distributions for the overall navigation system error (NSE) 204 are subsequently computed. Other inputs to the model include a defined set of fault conditions 206 and a look up table of worst case fault magnitudes 208, to be described further with respect to FIG. 3. The overall NSE distribution is a mixture PDF where the first component is for nominal (fault-free) operation and each of the remaining components models the NSE under a defined fault condition.

At the core of the NSIPM is a set of filter response models (FRMs) 212. The FRMs model the navigation error distribution under both nominal and faulted conditions. The central idea is that the overall navigation error PDF is to be computed by forming a weighted sum of component PDFs 214 corresponding to the response of the Kalman filter to each of a predetermined number of possible fault conditions. The weights 216 take into account the occurrence probabilities of the faults and the integrity monitor decisions. The navigation error PDF produced by this approach will in general be a mixture PDF. Since the faults are discrete while the errors they produce are continuous, if the outputs of the FRMs are Gaussian distributed, then the overall NSE distribution will be a Gaussian mixture. Once the mixture PDF is computed, it can be used with standard statistical procedures to compute the probability of satisfying integrity requirements or for the generation of protection levels, which are confidence intervals on the mixture PDF. By using a conservative approach to the performance modelling of various components (e.g., the pseudo-range error distribution), the performance model can be made to bound the worst case system performance. Construction of overbounding Gaussian distributions is known in the navigation literature.

Considering nominal system performance modelling, analysis of an extended Kalman filter with time-varying coefficients (of the type required for INS filtering or integrated INS/GPS filtering) is not generally practicable, and hence an alternative approach considering only GPS measurements is proposed. This approach is premised on two main assumptions. Firstly, the analysis of a filter with only GPS measurements is necessarily easier than analysing an integrated INS/GPS filter. Secondly, an estimator based only on GPS measurements (pseudo-range, Doppler, and ambiguity-fixed carrier phase), should yield a less accurate solution than an integrated INS/GPS solution with appropriate integrity monitors and redundant inertial sensors. Thus bounds on the estimation performance should be conservative.

Due to the large orbital radius of GNSS satellites in comparison with the distances involved in a typical relative navigation application, the terrestrial GPS-only navigation problem is almost linear. Therefore the linear approximation in the extended Kalman filter (EKF) for the GPS-only solution in the fault-free case is very accurate.

Simulations performed for various satellite geometries indicate that the EKF in the GPS-only case is capable of providing an accurate estimate of the actual error covariance in the nominal case provided that the estimation time interval and sampling time are appropriately chosen (for instance, the sampling time should be long enough to ensure that the pseudo-range measurement errors are temporally decorrelated). It is therefore proposed to use a GPS-only EKF to determine the nominal NSE distribution by applying it to a sliding window of GPS data. The nominal NSE PDF is therefore based on, the filter covariance from the EKF when known sources of nominal error are accounted for in the process and measurement noise covariance matrices.

It is well known that the error covariance obtained from the Kalman filter covariance update equation can be precomputed when the system and noise covariance matrices are known. This approach can be used to predict performance ahead in time if a trajectory model is assumed for user and satellite motion. Such an approach can be used as a basis for predicted protection level calculations, which are needed to obtain continuity performance figures.

In the faulted case, the nominal filter model is augmented with a signal fault model. This can take the form of a step or ramp in the pseudo-range measurement of a given satellite, for example. When the fault occurs, the filter model is incorrect, and its covariance does not accurately reflect the true estimation errors. On the other hand, it is possible to characterise the estimation errors when the fault magnitude is known, which is the case when a worst case fault magnitude is assumed. Furthermore, although the measurement matrix for the GPS-only navigation problem is time-varying, the time variation is small over a period of several minutes. This makes it possible to assume a time-invariant Kalman filter instead of an extended Kalman filter. Details of this type of steady-state analysis are presented for step and ramp faults in Examples 1 and 2 below.

The analysis makes use of standard theory to obtain the solution of a linear system via the variation of constants formula. The approach is valid for any number of satellite ranging measurements that guarantee the observability of the EKF state and allows the state estimation difference due to a step fault of known magnitude to be computed at any given time after the onset of the fault. The analysis can be extended to cover ramp faults of known slope and onset time. In both of these cases, the new mean value of the fault-specific NSE distribution can be computed analytically from the system model, fault model and associated error covariance matrices.

Consider, for example, a hypothetical case with two components corresponding to nominal and faulted operation, with respective prior probabilities $p_0$ and $p_1$, and with $p_0+p_1=1$. If the navigation system error (NSE) is a Gaussian distribution $N(\mu_0,\sigma_0)$ under nominal conditions and $N(\mu_1,\sigma_1)$ under the faulted condition (for instance, a step error in one pseudo-range measurement), then the mixture distribution that describes the overall navigation errors is of the form $p_0 N(\mu_0,\sigma_0)+p_1 N(\mu_0,\sigma_0)$. This two-component Gaussian mixture can be thought of as a multimodal Gaussian distribution. This idea easily generalizes to multi-dimensional distributions for navigation errors. Gaussian mixtures are preferred for computational reasons and have been used extensively in many areas of engineering but other component distributions are possible.

More generally, there will be a finite number of components n, such that $\theta_i$ is the parameter vector of the component PDF corresponding to fault condition i, where i=1, 2, ..., n. Component probability density functions are written as $p_i(x; \sigma_i)$ where x is the random variable (e.g., the vector of position, velocity and receiver clock bias states in a GPS filter). Positive weights $\tau_i$ are assigned to each component, representing the probability that x is from component i (i.e., the probability of the i-th fault condition) and summing to unity. The mixture density is then given as:

$$p(x) = \sum_{i=1}^{n} \pi_i p_i(x; \theta_i).$$

When the component densities are multivariable Gaussian PDFs then: $p_i(x;\theta_i)=N(x;\mu_i,P_i)$ and $$p(x) = \sum_{i=1}^{n} \pi_i N(x; \mu_i, P_i),$$

where $\mu_i$ is the mean vector of the i-th component and $P_i$ is the covariance matrix of the i-th component.

It is known that an arbitrary multivariable PDF can be represented to any desired accuracy as a Gaussian mixture with sufficiently many components. In certain cases, however, it may be more appropriate to use a component PDF with a different form.

An example of an overall NSE distribution framework is illustrated in FIG. 4. For each of a set of predetermined fault conditions 402, fault specific NSE distributions 404 are calculated in the required coordinate frame (e.g., horizontal, vertical, and along track axes). A weighted sum of these distributions is formed at 406, the weighting being dependent on the prior fault occurrence probabilities 408, where the total prior fault probability budget is unity.

Protection levels correspond to confidence intervals on the mixture distribution expressed in the required coordinate frame. These can be obtained by standard numerical methods once the mixture distribution for the NSE (204 of FIG. 2) has been obtained in the reference coordinate frame used by the navigation filter. The transformation from the reference coordinate frame to required coordinate frame can be achieved using well known coordinate transformations. Depending on the required navigation coordinate frame, the platform attitude may be needed. This can be supplied by an inertial navigation system, for example. Also derivable are probabilities of exceeding prescribed alert limits in the required coordinate frame.

A review of the relevant literature was carried out with a view to establishing a comprehensive list of failure modes that could be relevant to an SRGPS system. A database was compiled containing over 90 potential failure modes, faults and anomalies. This list was eventually reduced to around 30 possible failure modes specific to the proposed SRGPS architecture.

Examples of discrete failure modes for the example of determining the position of an aircraft relative to a ship include:
- Ionospheric anomalies
- Ship GPS hardware
- Satellite Software
- Ship-aircraft communications software
- Satellite dynamics out of specification.

From an integrity performance characterisation perspective, it is necessary to determine which SRGPS signals may be affected by each failure mode. Equally, for each failure mode, the type of data- and signal-level effects that can be produced are categorised. This includes effects on the continuous-time signals impinging on the reference receiver antennas as well as on the discrete-time (sampled) signals or "data" that are processed by the navigation filters.

It is important to keep the filter performance model as simple as practicable while retaining a sufficient level of fidelity so that the overall performance characterisation is not too conservative or "loose". All failure modes that result in the same type of effect may be grouped in order to simplify the model by restricting attention to a minimal class of signal degradation threats.

It is equally important to distinguish where in the system a fault occurs and what its downstream effects are. Many of the failure modes can be viewed as having underlying upstream causes—a simpler model results by eliminating faults that are caused by other faults.

The NSIPM also models the integrity monitor responses, which influence the prior probabilities of various faults (for instance, the probability of a fault-free alarm or a missed fault detection in the integrity monitoring system). In determining the occurrence probabilities of the various failure modes, it is important to consider the performance of the integrity monitors in the system, whose function is to detect and isolate faults. Some failure modes are relatively easy to monitor and, with appropriate integrity monitoring, the residual integrity threat may be considered to be negligible in terms of the system-level integrity probability. (This approach is taken in the LAAS system, for instance, where so-called H2 fault hypotheses are considered to be completely mitigated by the integrity monitoring system.) Other failure modes, e.g. satellite clock drift, may produce a slow ramp on a ranging signal that is difficult to detect using conventional integrity monitoring strategies.

A proposed approach is to categorise all failure modes in terms of a small number of signal-level fault effects and affected signals. Signal-level effects include: step, ramp, and unavailable data. Affected signals include code (pseudo-range) and carrier phase measurements, navigation data, and the navigation solution. A signal level effect acting on a given signal is taken in this example to constitute a specific fault condition. The utility of this type of characterisation is to allow occurrence probabilities of various failure modes to be combined to give an overall occurrence probability for a particular fault condition. A failure modes and effects matrix can be drawn up drawn up in order to reference the measurement-level fault effects of the individual failure modes. The matrix allows the prior occurrence data for failure modes in the same grouping to be combined from an integrity performance modelling perspective.

The net outcome of this process is a list of fault conditions and their prior occurrence probabilities or weights. The weights are normalised so that their sum is unity. Examples of fault conditions include:
- Pseudo-range step on satellite ranging signal j
- Pseudo-range ramp on satellite ranging signal j
- Carrier phase step on satellite ranging signal j
- Unavailable data on satellite ranging signal j where j is in the range 1, ..., M and M is the number of visible GNSS satellites.

In practice the "magnitude" or "size" of the fault condition (e.g., pseudo-range step size or ramp slope) is unknown. In order to avoid having to deal with a continuum of possible fault sizes, a conservative performance modeling approach is proposed that identifies the worst-case magnitude for each fault condition, as illustrated in FIGS. 3 and 5.

For each system configuration (e.g., satellite and receiver positions), numerical simulation (or an equivalent approach) is used to establish the worst case fault size for each specific failure mode. Thus a number of different fault magnitudes are tested against an appropriately defined criterion for that given fault, and the one that yields the highest integrity threat according to the criterion is selected. The definition of appropriate criteria will often benefit from a knowledge of the navigation system equipment and the incorporated integrity monitoring functions, and in certain cases, system designers may be able to provide appropriate values which are known to be problematic. Alternatively, it is possible to define various theoretical optimisation criteria according to the particular definition of what constitutes an integrity failure.

Figure 3:
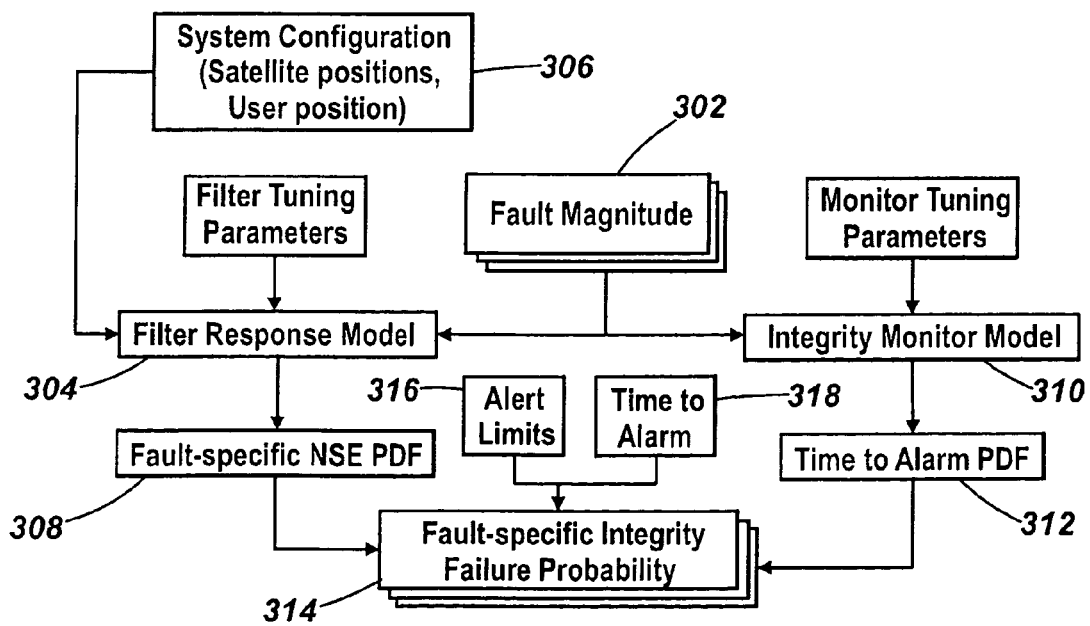
FIG. 3 illustrates the computation of a look-up table for worst case fault magnitudes.

In FIG. 3, trial fault magnitudes 302 are input to filter response model 304, which also receives system configuration data 306. The fault specific NSE PDF 308 is computed. Fault magnitudes are also input to integrity monitor model 310 and the time to alarm PDF 312 is computed. The probability of integrity failure is calculated at 314, according to a pre-defined fault specific optimisation criterion, which criterion depends upon defined alert limits 316 and time to alarm 318 in this case. For each given system configuration of interest, the fault specific integrity failure probability is calculated for each of a sample of trial fault magnitudes, and the fault magnitude giving the greatest probability is selected and recorded.

To obtain a worst case fault magnitude, the integrity monitor performance is assumed to be characterized for each specific fault type as a function of the fault magnitude. Integrity monitors can be viewed as statistical hypothesis tests and hence their performance can be characterized, by means of analysis or simulation, in terms of well known quantities such as probability of detection, probability of false alarm and time to alarm (the time to detect a fault). Detection and false alarm probabilities for hypothesis tests and statistical characterizations of time to alarm for sequential hypothesis tests are found in the literature. In general, integrity monitor performance is dependent on the type of integrity monitoring test that has been chosen to detect the fault and the specific tuning parameters that have been selected.

As a first example of an optimization criterion for worst case fault magnitudes, one may seek the largest fault magnitude $\beta_i^*$ for fault condition $\xi_i$ for which the probability of fault detection is less than or equal to a given probability.

Depending on the application, the time-to-alarm (TA) may be a significant factor when considering integrity. In such cases, a more appropriate optimization criterion might be to select the largest fault magnitude $\beta_i^*$ such that the time to detect the fault is greater than or equal to the specified TA.

An optimization criterion that considers both the NSE and the time-to-alarm is given by $$\beta_i^* = \arg\max_{\beta_i} Pr(|\epsilon|>AL|\xi_i,\beta_i)$$

where $\beta_i$ is the fault magnitude for fault condition $\epsilon_i$, $\epsilon$ is the NSE and $\tau$ is the time-to-alarm. Both the NSE and time-to-alarm are random variables in general. $Pr(|\epsilon|>AL|\xi_i, \beta_i)$ is the probability of obtaining an absolute NSE outside the alert limits for the specific fault condition and fault magnitude, which can be computed from the NSE PDF $p(\epsilon|\xi_i, \beta_i)$ for the specific fault condition and fault magnitude. $Pr(\tau>TA|\xi_i, \beta_i)$ is the probability that the time to alarm is greater than the specified TA, which can be computed from the time-to-alarm PDF $p(\tau|\xi_i, \beta_i)$ for each specific fault condition $\xi_i$ and fault magnitude $\beta_i$. This optimization criterion is useful when an integrity failure is defined as the simultaneous occurrence of the following two events: (i) the NSE exceeds the alert limits; and (ii) the time-to-alarm exceeds the specified TA.

An example worst case fault size calculation is further illustrated in FIG. 5. This particular optimization criterion corresponds to the simultaneous event where (i) the NSE exceeds the alert limits and (ii) the time-to-alarm exceeds the specified maximum TA.

A set of trial fault magnitudes 502 are input to the filter response model for a given fault condition, and the NSE PDF 504 is calculated in the desired coordinate system and number of dimensions, for instance: horizontal, vertical and along-track. For some coordinate systems, it may be necessary to transform the NSE distribution. The probability that the NSE exceeds the alert limits is computed from the NSE PDF. Marginalization of the multivariable NSE distribution may also be required to obtain the PDF in the desired number of dimensions. The mixture distribution of the time to alarm 506 is also calculated. The probability that the time to alarm exceeds the specified TA is then computed. For each trial fault magnitude, these two probabilities are multiplied, and a worst case fault magnitude is then selected at 508.

The worst case fault size will typically depend on the system configuration (satellite geometry, receiver location), and therefore multiple worst case magnitudes may have to be stored in a look-up table indexed by the corresponding system configuration. The computation of the look-up table for worst case fault sizes can be achieved off-line.

In navigation systems designed for safety of life applications and elsewhere, the integrity probability is an important top-level system requirement. The integrity failure probability $P_{IF}$ is one minus the integrity probability. For high performance navigation systems, it is not uncommon to require a $P_{IF}$ of 1 in 10 to the power 7 or better. Such a requirement is difficult to demonstrate purely on the basis of brute-force computer simulations. The mixture framework for navigation system integrity performance modelling uses the fault conditions, fault probability budget and filter response models together with the worst case fault magnitudes to obtain an computationally tractable expression for $P_{IF}$.

We give an example computation for the probability of an integrity failure for the case in which the navigation system error E exceeds the alert limit (AL) and (simultaneously) the time-to-alarm ti of navigation system the integrity monitoring function exceeds the specified time-to-alarm (TA). The computation results in an approximate overbound on the integrity failure probability. This method requires modelling of the response time or time-to-alarm of the integrity monitors under defined fault conditions. The integrity failure probability is defined, in this case, as $$P_{IF} = Pr(|\epsilon|>AL, \tau>TA),$$

where it is understood that the notation $|\epsilon|>AL$ means that the magnitude of the NSE exceeds the alert limits in each positional dimension under consideration.

As in the previous section we denote the fault magnitude or size for fault condition $\xi_i$ by $\beta_i$. The number of fault conditions is taken to be N. Fault condition $\xi_0$ is reserved for nominal (fault-free) operation whereas fault conditions $\xi_1, \ldots, \xi_N$ are for faults with non-zero sizes. The sizes do not need to be scalar quantities. In general a fault may entail a number of different parameters (e.g., onset time and slope, in the case of a ramp fault on pseudo-range).

We assume that the faults are exclusive, that is, only one fault (or the nominal operation mode) may occur at any one time, indicated by $\xi_i$ for the i-th fault. The fault sizes $\beta_i, \ldots, \beta_N$ are assumed to be independently but not necessarily identically distributed continuous random variables. Their individual probability density functions $p(\beta_i)$ are assumed to be known. The joint PDF of the fault indicator and the fault sizes satisfies the normalization requirement $$\sum_{i=0}^{N} \int d\beta_1 \ldots \int d\beta_N \, p(\xi_i, \beta_1, \ldots, \beta_N) = 1.$$

Due to the independence of fault conditions, we can write $$p(\xi_i, \beta_1, \ldots, \beta_N) = p(\beta_i, \xi_i) \prod_{j \neq i} p(\beta_j) = p(\beta_i | \xi_i) Pr(\xi_i) \prod_{j \neq i} p(\beta_j)$$

where we use p( ) to denote a PDF and Pr( ) to denote a probability.

Using conventional probability theory [11], we have $$P_{IF} = \sum_{i=0}^{N} \int d\beta_1 \ldots \int d\beta_N \, Pr(|\epsilon|>AL, \tau>TA, \xi_i, \beta_1, \ldots, \beta_N).$$

Using the previous result, the integrand can be reexpressed as $$Pr(|\epsilon|>AL, \tau>TA, \xi_i, \beta_1, \ldots, \beta_N) =$$
$$Pr(|\epsilon|>AL, \tau>TA | \xi_i, \beta_i) p(\beta_i | \xi_i) Pr(\xi_i) \prod_{j \neq i} p(\beta_j)$$

noting that under fault condition $\xi_i$, the joint probability of NSE and time-to-alarm is independent of the fault magnitudes $\beta_j$, $j \neq i$. We therefore have $$P_{IF} = \sum_{i=0}^{N} Pr(\xi_i) \int Pr(|\epsilon| > AL, \tau > TA \mid \xi_i, \beta_i) p(\beta_i \mid \xi_i) d\beta_i \prod_{i \neq j} \int p(\beta_j) d\beta_j.$$

The product term on the right hand side of the above is unity by definition of the probability density function. We now use the concept of the worst case fault magnitude in the previous section to write $$Pr(|\epsilon| > AL, \tau > TA \mid \xi_i, \beta_i) \leq \max_{\beta_i} Pr(|\epsilon| > AL, \tau > TA \mid \xi_i, \beta_i) \stackrel{\Delta}{=}$$
$$Pr(|\epsilon| > AL, \tau > TA \mid \xi_i, \beta_i^*)$$

where the worst case fault magnitude for fault condition i is defined as $$\beta_i^* \stackrel{\Delta}{=} \underset{\beta_i}{\mathrm{argmax}} Pr(|\epsilon| > AL, \tau > TA \mid \xi_i, \beta_i)$$

For practical purposes, we replace the joint PDF of NSE and time-to-alarm by a product of marginal PDFs:

$$\beta_i^* = \underset{\beta_i}{\mathrm{argmax}} Pr(|\epsilon| > AL \mid \xi_i, \beta_i) Pr(\tau > TA \mid \xi_i, \beta_i)$$

which aligns with one of the definitions of worst case fault magnitude in the previous section. It now follows that $$\cdot Pr(|\epsilon|>AL,\tau>TA|\epsilon_i,\beta_i)p(\beta_i|\xi_i)d\beta_i \leq Pr(|\epsilon|>AL,\tau>TA|\xi_i,$$
$$\beta^*_i)\int p(\beta_i|\xi_i)d\beta_i = Pr(|\epsilon|>AL,\tau>TA|\xi_i,\beta^*_i), i>0$$

Combining the above results, it is now straightforward to prove the following approximate upper bound on the integrity failure probability $$P_{IF} \leq \sum_{i=0}^{N} Pr(\xi_i) Pr(|\epsilon| > AL, \tau > TA \mid \xi_i, \beta_i^*) \approx$$
$$Pr(\xi_0) Pr(|\epsilon| > AL \mid \xi_0) Pr(\tau > TA \mid \xi_0) +$$
$$\sum_{i=1}^{N} Pr(\xi_i) Pr(|\epsilon| > AL \mid \xi_i, \beta_i^*) Pr(\tau > TA \mid \xi_i, \beta_i^*)$$

where the fact that there is no fault in the nominal operating mode has been used.

The probabilities in the above expression can be computed from the nominal and fault-specific NSE and time-to-alarm distributions given the worst case fault sizes $\beta^*_i$ by weighting the obtained probabilities by the respective prior fault probabilities $Pr(\xi_i)$. For instance, if the NSE distribution for fault condition i is Gaussian, then the term $Pr(|\epsilon|>AL|\xi_i,\beta^*_i)$ corresponds to the integral of a multidimensional Gaussian distribution over a box-shaped region centred at the origin, which can be obtained using standard numerical methods.

The construction of the nominal and fault-specific NSE distributions for a GPS-only extended Kalman filter is covered in the following examples.

EXAMPLE 1

Filter Response Model for Unmodelled Step Fault

The analysis in Example 1 applies to a filter where the estimation error is sought. In the NSIPM, we are interested in the closely related problem of modelling the statistics of the difference between the state of a Kalman filter of a fault-free (or nominal) system and the same Kalman filter when there is an unmodelled step-fault in the system output. For simplicity, we apply steady-state analysis. The nominal model is taken as $$M_0 \begin{bmatrix} x_{k+1} = Fx_k + v_k, & x_0 \text{ given} \\ z_k = Hx_k + w_k \end{bmatrix}$$

where $x_k$ is the system state at time k, $z_k$ is the system output at time k, F is the system transition matrix, H is the measurement matrix, $v_k$ is the process noise sequence, $w_k$ is the measurement noise sequence, and standard Kalman filtering assumptions apply to the noise sequences [4].

The steady-state Kalman filter for the system has state recursion $$\hat{x}_{k+1} = A\hat{x}_k + Bz_{k+1}$$
$$A \stackrel{\Delta}{=} (I-\overline{K}H)F, B \stackrel{\Delta}{=} \overline{K}$$

where $\overline{K}$ is the Kalman gain given by $\overline{K} = \overline{P}H^T S^{-1}$, $\overline{P}$ is the state error covariance and S is the measurement prediction covariance. For a steady-state analysis, $\overline{P}$ and $\overline{K}$ are taken to be constant, although $\overline{P}$ does not have to be taken as the positive definite solution of the discrete-time algebraic Riccati equation.

Solving the above system yields the following expression for the state estimate at time k in terms of the initial state estimate and sequence of measurements:

$$\hat{x}_k^{(0)} = A^k \hat{x}_0 + \sum_{m=1}^{k} A^{k-m} B z_m, k > 0$$

In the case of a step fault in the system output (e.g., the pseudo-range), the model is taken as $$M_1 \begin{bmatrix} x_{k+1} = Fx_k + v_k \\ z_k = Hx_k + L + w_k \end{bmatrix}$$

where L is a constant non-zero vector of step fault magnitudes. For convenience we take the occurrence time of the step to be at time 0+(just after time 0).

The steady-state Kalman filter for the system has the same state recursion as before, since the fault condition is unmodelled in the filter. However, the measurements now contain the step fault, thus, under model 1:

$$\hat{x}_k^{(1)} = A^k \hat{x}_0 + \sum_{m=1}^{k} A^{k-m} B(z_m + L), k > 0.$$

Now define the difference between the state estimates at time k for the two models as $$\epsilon_k \triangleq \bar{x}_k^{(1)} - \bar{x}_k^{(0)}$$

where, at time 0, $\epsilon_0=0$. It now follows that the expected difference or error due to the step fault (at time k) is given by $$\varepsilon_k = \sum_{m=1}^{k} A^{k-m} BL, k > 0$$

The presence of a deterministic step fault in the measurement process does not affect the covariance calculations of the Kalman filter. Hence the covariance of the error may be taken as the covariance from the Kalman filter $\bar{P}$. The PDF of the state estimation error k samples after the occurrence of a step fault is therefore $$N\left(\sum_{m=1}^{k} A^{k-m} BL, \bar{P}\right)$$

where N(m,P) denotes a multivariate Gaussian PDF with mean m and covariance P.

In a GPS-only filter, the KF is actually an extended Kalman filter with a linearised measurement matrix $H_k$. The above PDF should still be a reasonable approximation as long as the other standard Kalman filtering assumptions are valid (zero-mean and whiteness of noise sequences, etc). If the true process and measurement noise covariance are unknown, a conservative overbound should be used. For GPS filtering, $\bar{K}$ may be taken to be the time-varying EKF gain and $\bar{P}$ the time-varying EKF covariance (after a suitable settling time has elapsed). After an initial transient, both of these quantities vary slowly with time in GNSS applications.

EXAMPLE 2

Filter Response Model for Unmodelled Ramp Fault

As in Example 1, the nominal model is taken as:

$$M_0 \begin{bmatrix} x_{k+1} = Fx_k + v_k, & x_0 \text{ given} \\ z_k = Hx_k + w_k \end{bmatrix}$$

The steady-state Kalman filter for the system has state recursion $$\hat{x}_{k+1} = A\hat{x}_k + Bz_{k+1}$$

$$A \triangleq (I - \bar{K}H)F, B \triangleq \bar{K}$$

where $\bar{K}$ is the Kalman gain. Solving the above system yields the following expression for the state estimate:

$$\hat{x}_k^{(0)} = A^k \hat{x}_0 + \sum_{m=1}^{k} A^{k-m} Bz_m, k > 0$$

In the case of a ramp fault in the system output (e.g., the pseudo-range), the model is taken as $$M_1 \begin{bmatrix} x_{k+1} = Fx_k + v_k \\ z_k = Hx_k + LkT + w_k \end{bmatrix}$$

where L is a constant non-zero vector of ramp fault slopes and T is the sampling time interval. For convenience we take the occurrence time of the ramp fault to be at time 0.

The steady-state Kalman filter for the system has the same state recursion as before, since the fault condition is unmodelled in the filter. However, the measurements now contain the ramp fault, thus, under model 1:

$$\hat{x}_k^{(1)} = A^k \hat{x}_0 + \sum_{m=1}^{k} A^{k-m} B(z_m + LmT), k > 0.$$

Now define the difference between the state estimates at time k for the two models as $$\epsilon_k \triangleq \hat{x}_k^{(1)} - \bar{x}_k^{(0)}$$

then it follows that the expected difference or error due to the ramp fault (at time k) is given by $$\varepsilon_k = \sum_{m=1}^{k} A^{k-m} BLmT, k > 0.$$

The presence of a deterministic ramp fault in the measurement process does not affect the covariance calculations of the Kalman filter. Hence the covariance of the error may be taken as the covariance from the Kalman filter $\bar{P}$. The PDF of the state estimation error k samples after the occurrence of a ramp fault is therefore $$N\left(\sum_{m=1}^{k} A^{k-m} BLmT, \bar{P}\right).$$

A recursion for generating the mean error due to the ramp fault is $$\epsilon_k = A\epsilon_{k-1} + kBLT, k>0, \epsilon_0=0.$$

The same comments as in Example 1 concerning the applicability of steady-sate analysis apply here. In particular, for GNSS filtering, the steady state covariance may be replaced by the time-varying covariance from the EKF after a settling time has elapsed.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method for modelling integrity of a filtered global navigation satellite system, the method comprising:
   defining a set of fault conditions;
   calculating a component navigation system error distribution for a no fault condition;
   calculating component navigation system error distributions for the defined set of fault conditions; and determining, with a processor, overall navigation error distribution by forming a mixture distribution from said component navigation system error distributions.

2. A method according to claim 1, further comprising defining prior probabilities for said fault conditions, and wherein said mixture distribution is determined by weighting according to said component probabilities.

3. A method according to claim 1, further comprising deriving one or more protection levels from said overall navigation error distribution.

4. A method according to claim 1, further comprising deriving the probability of exceeding alert limits from said overall navigation error distribution.

5. A method according to claim 1, further comprising defining fixed fault magnitudes corresponding to said plurality of fault conditions.

6. A method according to claim 5, further comprising defining an optimisation criterion for a given fault condition and selecting the fault magnitude which yields the maximum integrity threat when evaluated against said optimisation criterion.

7. A method according to claim 5, wherein said fixed fault magnitudes are defined according to:

$$\beta_i^* = arg\,max_{\beta_i} Pr(|\epsilon|>AL|\xi_i,\beta_i)Pr(\tau>TA|\xi_i,\beta_i)$$

where AL is the alert limit, TA is the specified time-to-alarm, $\epsilon$ is the navigation system error, $\tau$ is the time-to-alarm of the integrity monitor for the fault condition, $\beta$ is the fault magnitude, and $\xi_i$ indicates that fault condition i is applicable.

8. A method according to claim 1, wherein each fault condition is selected from one of a defined plurality of signal level effects.

9. A method according to claim 8, wherein said plurality of signal level effects include step and ramp faults.

10. A method according to claim 8, wherein each fault condition is selected from one of step, ramp or signal unavailable faults.

11. A method according to claim 1, wherein one of more filter response models is used to calculate said component navigation system error distributions.

12. A method according to claim 11, wherein an estimation theoretic filter is used.

13. A method according to claim 1, wherein the component navigation system error distributions are modelled as Gaussian.

14. An integrity performance model for a filtered navigation system, said model comprising:
- a set of possible fault conditions stored in a memory;
- a plurality of filter response models, adapted to produce component navigation error distributions for a fault-free condition and for said plurality of fault conditions; and
- a mixture processor adapted to produce overall navigation error by forming a mixture distribution from said plurality of component navigation system error distributions output from said filter response models.

15. An integrity performance model according to claim 14, further comprising a plurality of fixed fault magnitudes stored in a memory, said fixed fault magnitudes corresponding to said set of fault conditions.

* * * * *